ARRANGEMENT FOR CONTROLLING CROSSPOINTS TO COMPLETE CONNECTING PATHS IN TELEPHONE EXCHANGE SYSTEMS

Filed June 22, 1966 2 Sheets-Sheet 2

INVENTOR

G. Kohler - N. Lewen

BY James B. Raden

ATTORNEY

United States Patent Office 3,519,753
Patented July 7, 1970

3,519,753
ARRANGEMENT FOR CONTROLLING CROSS-POINTS TO COMPLETE CONNECTING PATHS IN TELEPHONE EXCHANGE SYSTEMS

Gerhard Kohler, Stuttgart-Weilimdorf, and Nikolaus Lewen, Tamm, Germany, assignors to International Standard Electric Corporation Filed June 22, 1966, Ser. No. 559,558
Claims priority, application Germany, June 24, 1965, St 24,022
Int. Cl. H04q 3/42
U.S. Cl. 179—18 5 Claims

ABSTRACT OF THE DISCLOSURE

Translators are individually associated with each of a plurality of markers. Information items, corresponding to different desired connections, are received simultaneously in several translators. The translators provide setting information items for the markers responsive to the digital signals received directly from the registers associated with the translators. At the same time, only one of the markers can be seized by the translator associated with it and the translator remains in a waiting position until the marker can be seized.

The invention relates to telephone exchanges and particularly to crosspoint control arrangements for use in telephone exchanges equipped with registers, translators and markers, in which only one of the markers can control the setting of a connecting path at a time.

The control of crosspoint arrangements is accomplished in the prior art using a register in which are stored the code figures corresponding to a connection desired to be established. The register is connected to a translator and transfers the stored code figures to the translator. The translator provides the crosspoint information from the code figures. The setting information is returned to the register where it is stored for use by a marker. After the setting information has been stored in the register, the register connects itself with an idle marker via a corresponding selecting device and transfers to such a marker the setting information items. Thereupon the marker starts to control the establishment of a connection.

The disadvantages of the prior art system is the necessity of a double storage in the register (first the code figures or digits and thereafter the setting information items) and from an extended seizing period of the marker due to the rather time-wasting switching-on and off of the marker's connection to the register.

Similar disadvantages result from another system known, in which the register, carrying the code digits, is connected with a marker via a selecting device, and then transfers the code digits to the marker. The marker, then, requests a translator which provides the setting information items derived from the code digits.

It is the object of the invention to reduce the seizing period of the markers to accelerate handling of traffic through the cross point arrangement and, to avoid the above mentioned double storage in the register or in the marker.

The method according to the invention consists in that a translator is individually associated with each marker. Information items, corresponding to different connections desired to be established, can be received simultaneously in several translators which thereafter provide setting information items for the markers derived from the information items received from the register. At the same time, only one of the markers can be seized by the translator associated with it.

Figure 1:
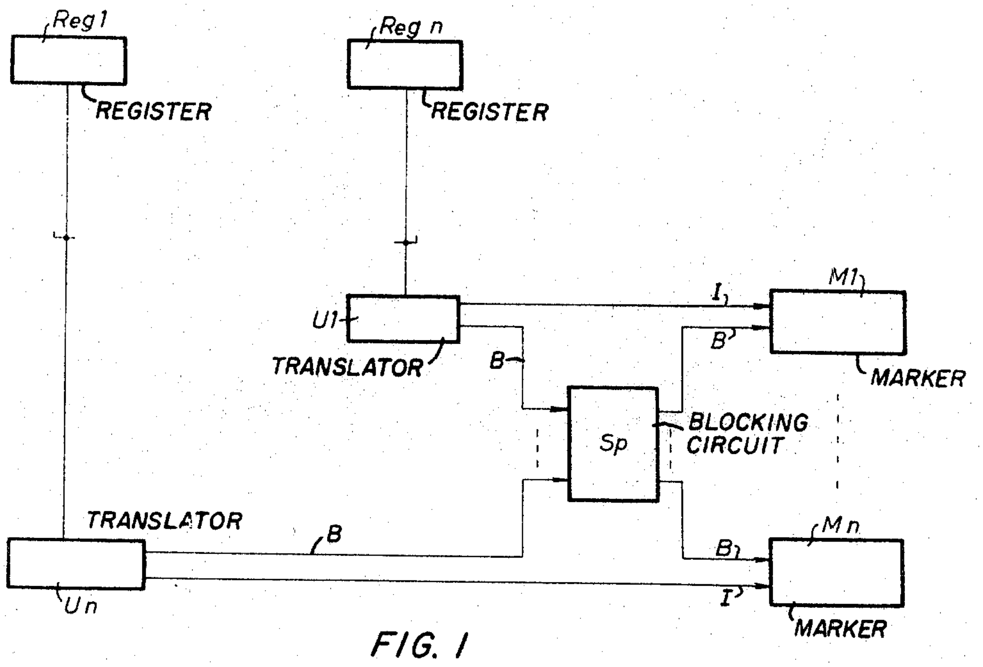
Figure 2:
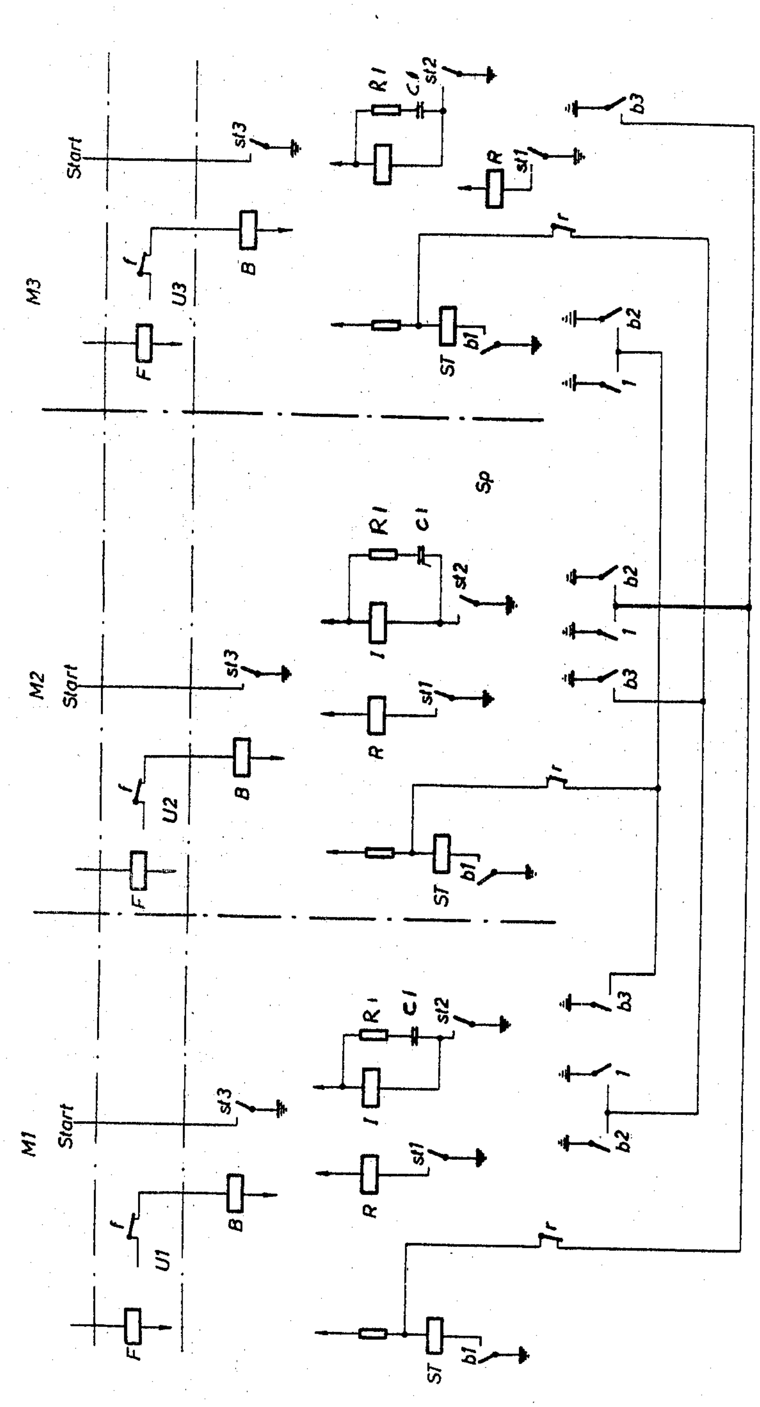

The above mentioned and other features of this invention and the manner of obtaining them will become more apparent, and the invention itself will be best understood by reference to the following description of an embodiment of the invention taken in conjunction with the accompanying drawings, in which:

FIG. 1 illustrates in block diagram form a central control facility for a crosspoint arrangement according to the invention; and FIG. 2 schematically illustrates the components and connections of the blocks of FIG. 1 which are necessary to provide the crosspoint arrangement.

As shown in FIG. 1, the central control facility comprises a series of markers M1–M*n*. A translator U1–U*n* is connected directly to the associated marker. More specifically, each translator is connected to its marker directly through a line I. A line B connects each translator to its marker through a blocking circuit S*p*. Line B serves to carry the seizure signals and line I serves to carry the information signals between translators and markers.

Each translator is also connected with a number of registers Reg 1–Reg *n* via suitable switching devices as indicated by the line intersecting the line connecting the translators to the registers.

The code digits are stored in a register, e.g. register Reg 1 to mark a connection desired to be established. Then the register is connected to an available translator U1. At the same time, the translator U1 is blocked to prevent its seizure by other registers. The translator U1 receives the code digits from the register Reg 1 forming therefrom the setting information to be forwarded to the marker M1. The translator requests marker M1 via the line B, which serves to seize the marker. If at that moment none of the other markers is seized by the translator associated with it, the blocking circuit S*p* forwards the seizing signal to the marker M1. The marker M1 is now in operation and receives from the translator U1 the setting information, formed by said translator.

The connection of the translator U1, with the marker M1, is maintained until the marker has established a connecting path to the desired output of the switching grid. If the marker finds no available connecting path with the aid of the setting information it received, further information items may be requested from the translator. When the marker M1 has completed the marking process, the translator U1 is notified. Thereupon said translator U1 is disconnected from the marker M1 and initiates its disconnection from the register Reg. 1, too. The marker is now again in its idle position and another marker, e.g. M*n* can be seized by the translator U*n* associated individually therewith.

If, when the translator U1 seizes the marker M1, another marker has already seized the translator associated with it, the blocking circuit S*p* then prevents that seizure of the marker M1. The translator U1 then remains in waiting position until the seizure of its individually associated marker is enabled by the blocking circuit S*p*. The blocking circuit S*p* will enable connection of translator U1 to marker M1 when the translator U*n* is disconnected from the marker M*n*. This occurs when the marker M*n* has completed its operation. Thereupon the translator U1 immediately seizes the marker M1.

FIG. 2 shows, schematically, the inventive common control circuit. A translator, such as translator U1, applies information ready for its associated marker M1, applies ground to the start wire. In greater detail, relay B in the chain of blocking relays in blocking circuit S*p* is operated by ground over the break contact *f*. Responsive to the operation of relay B, relay ST is energized over make contact *b*1 via the contact *st*1, so that the relay ST is no longer shorted via this contact. The relay I is caused to operate via the contact *st*2, and via the contact *st*3 a start signal is applied to the marker M1.

The marker M1 takes the setting information from the translator and controls the establishment of the connection. If another marker, such as marker M2, had already been operated by the translator U2 when the starting signal was transmitted by the translator U1, the relay ST associated with the translator U1 would have been inhibited as it would have been short-circuited via both the contact *b*2 of the relay B associated with translator U2.

The relay F in the translators, such as translator U2, operates and interrupts at its break contact *f*, the circuit for the relay B, only if the marker M2 transmits an "end" signal to the translator U2 when it has completed its function. The relay B is returned to normal when the break contact *f* opens. Responsive to relay B returning to normal the relay R and the relay I, will drop off after a time delay. The time delay may be caused by circuitry, such as the series circuitry including resistor R1 and capacitor C1 bridging the coil of relay I. Thus, the short-circuit for relay ST of the translator U1 is eliminated and it is enabled to operate via the closed contact *b*1. The relays ST which are associated with the other two translators, are not released simultaneously, because the relay 1 which is used to inhibit one of the ST relays is de-energized with a time delay; this means to imply that e.g. the translator U2 will at first enable the start relay ST of the translator U3 via contact *b*3 and subsequently enable the start relay ST of the translator U1, via contact 1.

Several translators can be simultaneously connected with registers and receive from said registers the code digits and from these digits the setting information for the markers. The blocking circuit S*p* prevents the seizing signals, emitted by said translators, from simultaneously seizing more than one marker. Only one of the translators at a time can seize the marker to which it is associated.

A translator that is again seized, immediately after it is disconnected from the marker and from a register can only seize its associated marker when all other translators in the waiting position prior to its seizure have completed operation.

If the code digits stored in a register being connected to a translator are insufficient to form a setting information for a marker, the translator informs the register accordingly and is disconnected from said register. Consequently, the marker being associated with said translator is not seized unnecessarily.

While the principles of the invention have been described above in connection with specific apparatus and applications, it is to be understood that this description is made only by way of example and not as a limitation on the scope of the invention.

We claim:

1. An arrangement for controlling crosspoints to complete connecting paths in a telephone exchange system comprising a plurality of registers common to said exchange system, translators for receiving coded information directly from said registers and deriving setting information therefrom, markers for controlling the setting of said connecting paths through said system responsive to receiving setting information from said translators, means for individually associating one of said translators to each of said markers, means for connecting said registers to available ones of said translators responsive to said registers receiving coded information corresponding to different connections desired to be established, and means for assuring that only one marker at a time can be seized by its individually associated translator.

2. An arrangement according to claim 1 wherein means are provided for causing said translators having the setting information for said individually associated marker to remain in waiting position until said individually associated marker can be seized.

3. An arrangement according to claim 1 wherein means are provided for enabling reseizure of said individually associated one of said markers after all of the other of said markers have been seized by the said individually associated translators that had prior setting information.

4. An arrangement according to claim 1 wherein said means for individually associating said translators to each of said markers includes blocking circuit means which allow the seizure of only one marker at a time.

5. An arrangement according to claim 4 wherein direct connecting means are provided for connecting each translator directly with the individually associated marker and said direct connecting means serving to transmit setting information.

References Cited

UNITED STATES PATENTS

| | | | |
|---|---|---|---|
| 2,585,904 | 2/1952 | Busch | 179—18 |
| 2,948,781 | 8/1960 | Sparrendahl. | |

KATHLEEN H. CLAFFY, Primary Examiner

W. A. HELVESTINE, Assistant Examiner